United States Patent
Sung et al.

(10) Patent No.: US 9,726,947 B2
(45) Date of Patent: Aug. 8, 2017

(54) LIQUID CRYSTAL DISPLAY DEVICE

(71) Applicant: Samsung Display Co., Ltd., Yongin, Gyeonggi-Do (KR)

(72) Inventors: Byoung-Hun Sung, Hwaseong-si (KR); Gak Seok Lee, Hwaseong-si (KR); Duckjong Suh, Seoul (KR)

(73) Assignee: Samsung Display Co., Ltd. (KR)

( * ) Notice: Subject to any disclaimer, the term of this patent is extended or adjusted under 35 U.S.C. 154(b) by 138 days.

(21) Appl. No.: 14/639,393

(22) Filed: Mar. 5, 2015

(65) Prior Publication Data
US 2015/0253610 A1    Sep. 10, 2015

(30) Foreign Application Priority Data
Mar. 6, 2014    (KR) .................. 10-2014-0026679

(51) Int. Cl.
*G02F 1/1339*    (2006.01)
*G02F 1/1345*    (2006.01)
*G02F 1/1343*    (2006.01)

(52) U.S. Cl.
CPC ........ *G02F 1/13452* (2013.01); *G02F 1/1339* (2013.01); *G02F 1/134336* (2013.01)

(58) Field of Classification Search
CPC ........... G01F 1/13452; G01F 1/134336; G01F 1/1339; G02F 1/1339; G02F 1/13452
USPC ....................................................... 349/153
See application file for complete search history.

(56) References Cited

U.S. PATENT DOCUMENTS

| | | | |
|---|---|---|---|
| 6,734,942 B2 | 5/2004 | Takeuchi | |
| 7,518,702 B2 | 4/2009 | Sakurada | |
| 7,705,942 B2 | 4/2010 | Liao | |
| 8,223,308 B2 | 7/2012 | Zhao et al. | |
| 2001/0004281 A1* | 6/2001 | Sasaki .................. | G02F 1/1339 349/190 |
| 2003/0086049 A1* | 5/2003 | Yamazaki ........... | G02F 1/13452 349/149 |
| 2007/0211202 A1 | 9/2007 | Ishii et al. | |
| 2010/0039605 A1* | 2/2010 | Zhao ..................... | G02F 1/1339 349/153 |
| 2011/0102727 A1 | 5/2011 | Hirato | |
| 2015/0002777 A1* | 1/2015 | Sugisaka ........... | G02F 1/134336 349/46 |

FOREIGN PATENT DOCUMENTS

| | | |
|---|---|---|
| KR | 1020070118364 A | 12/2007 |
| KR | 1020090100952 A | 9/2009 |
| KR | 1020120112430 A | 10/2012 |
| KR | 10-2016-0065315 A | 6/2016 |

* cited by examiner

*Primary Examiner* — Joseph L Williams
*Assistant Examiner* — Christopher Raabe
(74) *Attorney, Agent, or Firm* — Innovation Counsel LLP (57) ABSTRACT

A liquid crystal display device includes a first display substrate, a second display substrate, a liquid crystal layer, and a sealant. The sealant is disposed between the first display substrate and the second display substrate to seal the liquid crystal layer. The sealant includes a first sealant that contacts the liquid crystal layer and a second sealant across the first sealant from the liquid crystal layer. The first sealant has a cure rate greater than that of the second sealant, and may prevent moisture and impurities from entering the liquid crystal layer.

18 Claims, 6 Drawing Sheets

LIQUID CRYSTAL DISPLAY DEVICE

CROSS-REFERENCE TO RELATED APPLICATION

This U.S. non-provisional patent application claims priority, under 35 U.S.C. §119, from Korean Patent Application No. 10-2014-0026679 filed on Mar. 6, 2014, the contents of which are herein incorporated by reference.

BACKGROUND

1. Field of Disclosure

The present disclosure relates to a liquid crystal display device. More particularly, the present disclosure relates to a liquid crystal display device capable of preventing a visual artifacts from being generated at edges of a display area.

2. Description of the Related Art

As a popular form of flat panel display, liquid crystal display devices are widely used. A liquid crystal display device typically includes two display substrates, each having an electrode disposed thereon to form an electric field, and a liquid crystal layer interposed between the two display substrates. A liquid crystal display device applies voltage to the electrodes to form an electric field in the liquid crystal layer and to realign liquid crystal molecules of the liquid crystal layer, thereby controlling transmittance of light passing through the liquid crystal layer.

A liquid crystal display device also includes a sealant disposed between the two display substrates to contain the liquid crystal layer between the two display substrates. The sealant makes contact with the liquid crystal layer. The sealant is formed by curing a resin. When a degree of cure of the sealant is too low, defects, e.g., an afterimage, a stain, a light leakage, etc., occur in an area where the sealant makes contact with the liquid crystal layer.

SUMMARY

The present disclosure provides a liquid crystal display device capable of preventing defects from occurring in an area between a display area and a sealant.

The present disclosure provides a liquid crystal display device having a wide display area.

Embodiments of the inventive concept provide a liquid crystal display device including a first display substrate, a second display substrate, a liquid crystal layer, and a sealant.

The first display substrate faces the second display substrate. The liquid crystal layer is interposed between the first display substrate and the second display substrate. The sealant is disposed between the first display substrate and the second display substrate to seal the liquid crystal layer.

The sealant includes a first sealant that contacts the liquid crystal layer and a second sealant across the first sealant from the liquid crystal layer. The first sealant has a cure rate greater than a cure rate of the second sealant.

The first display substrate may include a display area and a non-display area surrounding the display area, and the sealant is overlapped with the non-display area.

The liquid crystal display device may further include a printed circuit board and a flexible printed circuit board.

The printed circuit board may control an operation of the first display substrate and the second display substrate. The flexible printed circuit board electrically connects the first display substrate and the printed circuit board.

The first display substrate may further include data lines, fan-out lines, and an upper common line.

The data lines may be disposed to overlap with the display area and extend in a first direction.

The fan-out lines may electrically connect the data lines to the flexible printed circuit board and are disposed to overlap with the non-display area.

The upper common line may be spaced apart from the fan-out lines and overlapped with the non-display area.

A ratio of an area of the fan-out lines and the upper common line to an area exposed by the fan-out lines and the upper common line in the first sealant may be greater than that of the second sealant.

The flexible printed circuit board may include a first flexible printed circuit board and a second flexible printed circuit board spaced apart from each other.

The fan-out lines may include a first fan-out line group connected to the first flexible printed circuit board and a second fan-out line group connected to the second flexible printed circuit board.

The upper common line may be disposed between the first fan-out line group and the second fan-out line group.

The upper common line may be connected to the flexible printed circuit board to receive a common voltage.

The sealant may be overlapped with the fan-out lines and the upper common line.

The upper common line may overlap the second sealant without overlapping the first sealant.

The upper common line may be formed as a mesh defined by lines with a uniform width.

According to embodiments, the upper common line may include a first upper common line overlapped with the first sealant and a second upper common line overlapped with the second sealant.

The first upper common line may be formed as a mesh defined by lines with a first width and the second upper common line may be formed as a mesh defined by lines with a second width greater than the first width.

The first display substrate may further include gate lines and a side common line.

The gate lines may be disposed to overlap the display area and extend in a second direction crossing the first direction.

The side common line may be spaced apart from the gate lines in the second direction and overlapped with the non-display area.

A ratio of an area of the side common line to an area exposed by the side common line in the first sealant may be greater than that of the second sealant.

The side common line may be connected to the flexible printed circuit board to receive a common voltage.

The side common line may overlap the second sealant without overlapping the first sealant.

The side common line may be formed as a mesh defined by lines with a uniform width.

According to embodiments, the side common line may include a first side common line overlapped with the first sealant and a second side common line overlapped with the second sealant.

The first side common line may be formed as a mesh defined by lines with a first width and a second side common line may be formed as a mesh defined by lines with a second width, the second width being greater than the first width.

According to the above, defects, such as afterimage, stain, light leakage, etc., may be prevented from being generated in the border area between the display area and the sealant. In addition, the display area of the liquid crystal display device becomes wider and the non-display area of the liquid crystal display device becomes smaller.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 1:
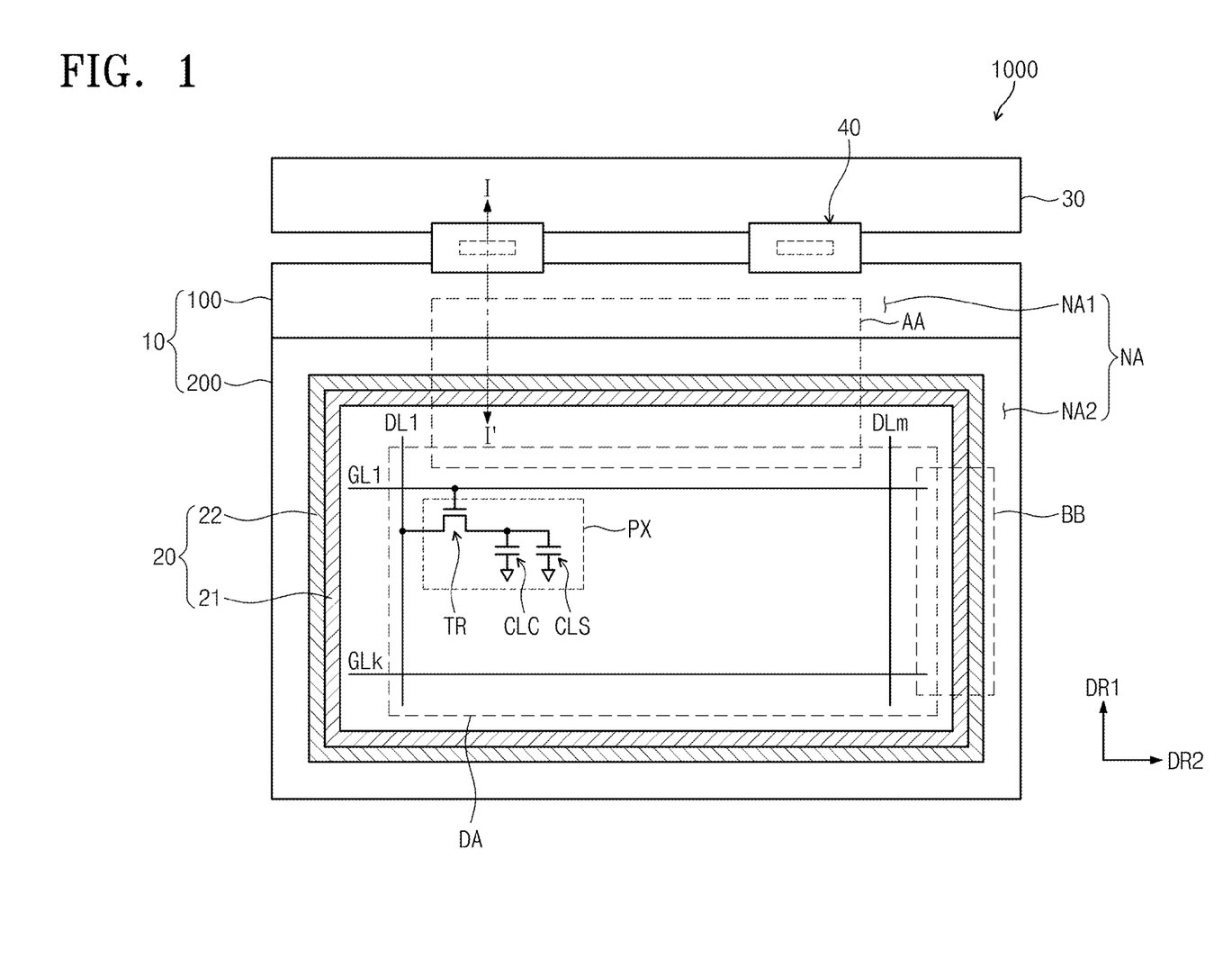
FIG. 1 is a plan view showing a liquid crystal display device according to an exemplary embodiment of the present disclosure.
Figure 2:
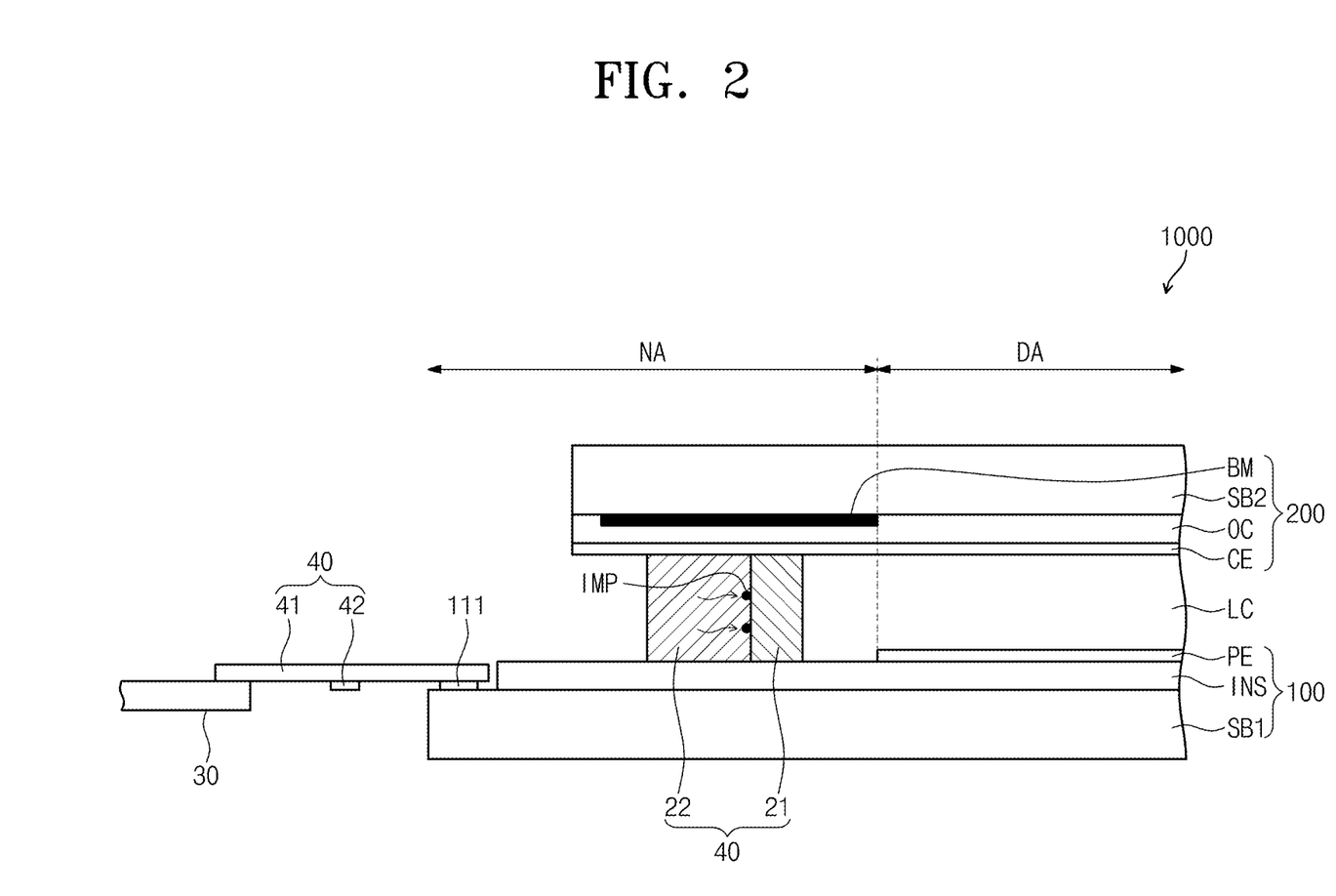
FIG. 2 is a cross-sectional view taken along a line I-I' of FIG. 1.

FIG. 1 is a plan view showing a liquid crystal display device according to an exemplary embodiment of the present disclosure and FIG. 2 is a cross-sectional view taken along a line I-I' of FIG. 1.

Referring to FIGS. 1 and 2, a liquid crystal display device 1000 includes a display panel 10, a printed circuit board 30, and a flexible printed circuit board 40.

The display panel 10 displays an image. The display panel 10 may be formed in various shapes. In the present exemplary embodiment, the display panel 10 has a rectangular shape having short sides extending in a first direction DR1 and long sides extending in a second direction DR2 substantially perpendicular to the first direction DR1. However, the shape of the display panel 10 is not limited to the rectangular shape.

The display panel 10 includes a first display substrate 100, a second display substrate 200, a liquid crystal layer LC, and a sealant 20.

The first display substrate 100 includes a display area DA and a non-display area NA surrounding the display area DA. The display area DA is an area in which the image is displayed, and the non-display area NA is an area in which no image is displayed. The non-display area NA includes a first non-display area NA1 and a second non-display area NA2. The flexible printed circuit board 40 is disposed in the first non-display area NA1, which in turn is disposed along the long side of the display panel 10, for example between the display area DA and the edge of the long sides. The second non-display area NA2 is disposed along the short side of the display panel 10, for example between the display area DA and the edge of the short sides.

The first display substrate 100 includes a plurality of gate lines GL1 to GLk receiving a gate signal and a plurality of data lines DL1 to DLm receiving a data voltage. The gate lines GL1 to GLk are insulated from the data lines DL1 to DLm while crossing the data lines DL1 to DLm.

A plurality of pixel areas, which is arranged in a matrix form and at least partially defined by the gate lines GL1 to GLk and the data lines DL1 to DLm, is formed in the display area DA. A plurality of pixels is disposed in the pixel areas. FIG. 1 shows an equivalent circuit diagram of only one pixel PX of the pixels as a representative example. The pixel PX includes a thin film transistor TR, a liquid crystal capacitor CLC, and a storage capacitor CLS.

Although not shown in figures, the thin film transistor TR includes a gate electrode, a source electrode, and a drain electrode. The gate electrode is connected to one gate line GL1 of the gate lines GL1 to GLk. The source electrode is connected to one data line DL1 of the data lines DL1 to DLm. The drain electrode is connected to the liquid crystal capacitor CLC and the storage capacitor CLS. The liquid crystal capacitor CLC and the storage capacitor CLS are connected to the drain electrode in parallel.

The first display substrate 100 further includes a first insulating substrate SB1, an insulating layer INS, and a pixel electrode PE.

The first insulating substrate SB1 includes a transparent insulating material. The insulating layer INS insulates the pixel electrode PE from elements disposed under the insulating layer INS. The insulating layer INS may include an organic insulating material or an inorganic insulating material. The thin film transistor TR, the gate lines GL1 to GLk, and the data lines DL1 to DLm may be disposed between the first insulating substrate SB1 and the insulating layer INS. However, for the convenience of explanation, the thin film transistor TR, the gate lines GL1 to GLk, and the data lines DL1 to DLm are omitted in FIG. 2.

The pixel electrode PE is disposed on the insulating layer INS and connected to the thin film transistor TR to receive the data voltage.

In the embodiment of FIG. 1, the first display substrate 100 has a size greater than that of the second display substrate 200. A pad electrode 111 is disposed in an area of the first display substrate 100 that is not overlapped with the second display substrate 200. The pad electrode 111 is bonded to and electrically connected to the flexible printed circuit board 40.

The second display substrate 200 is disposed to face the first display substrate 100. The second display substrate 200 includes a second insulating substrate SB2, a light blocking layer BM, an overcoat layer OC, and a common electrode CE.

The second insulating substrate SB2 includes a transparent insulating material. The light blocking layer BM is disposed to overlap with the non-display area NA. A border area between the non-display area NA and the display area DA is defined by the light blocking layer BM. The light blocking layer BM blocks light. The overcoat layer OC is disposed on the light blocking layer BM to planarize the surface that faces the first display substrate 100. The overcoat layer OC includes an insulating material.

Although not shown in the figures, the second display substrate 200 may further include a color filter disposed between the overcoat layer OC and the light blocking layer BM. The color filter assigns a color to incident light.

The common electrode CE is disposed on the overcoat layer OC. The common electrode CE receives a common voltage from an upper common line and a side common line, which will be described later. The position of the common electrode CE should not be limited to what is disclosed here. For example, the common electrode CE may be disposed on the first display substrate 100 according to an operational mode of the liquid crystal display device. In this case, the pixel electrode PE and the common electrode CE form a horizontal electric field when voltages are respectively applied thereto and control the liquid crystal layer LC.

In a case that the upper common line and the side common line are disposed on the first display substrate 100 and the common electrode CE is disposed on the second display substrate 200, the display panel 10 may further include a conductive spacer (not shown). The conductive spacer is disposed between the first display substrate 100 and the second display substrate 200 and includes a conductive material to electrically connect between the upper common line and the common electrode CE and between the side common line and the common electrode CE.

The liquid crystal layer LC is disposed between the first display substrate 100 and the second display substrate 200. The liquid crystal layer LC includes liquid crystal molecules, and the liquid crystal molecules are aligned according to the electric field formed in the liquid crystal layer LC to control transmittance of light.

The sealant 20 is disposed between the first display substrate 100 and the second display substrate 200 to seal the liquid crystal layer LC. The sealant 20 may be overlapped with the non-display area NA.

The sealant 20 includes a first sealant 21 and a second sealant 22. The first sealant 21 includes a surface making contact with the liquid crystal layer LC. The second sealant 22 faces the liquid crystal layer LC such that the first sealant 21 is disposed between the second sealant 22 and the liquid crystal layer LC. In other words, the first sealant 21 is disposed closer to the display area DA than the second sealant 22.

The first sealant 21 and the second sealant 22 may include a UV-curable material or a thermo-curable material, e.g., epoxy.

Since the sealant 20 seals the liquid crystal layer LC, the sealant 20 has the surface making contact with the liquid crystal layer LC. When the sealant 20 is not completely cured, moisture may enter the liquid crystal layer LC through an uncured portion of the sealant 20, e.g., in a dehydration reaction phenomenon, or ion impurities may enter the liquid crystal layer LC. As a result of the contamination of the liquid crystal layer LC, response speed of the liquid crystal molecules in the liquid crystal layer LC is lowered, and defects, such as an afterimage, a stain, a light leakage, etc., may occur at a border area between the liquid crystal layer LC and the sealant 20.

In the liquid crystal display device 1000 according to the present exemplary embodiment, the first sealant 21 has a cure rate higher than that of the second sealant 22. Since the second sealant 22 has the cure rate lower than that of the first sealant 21, the second sealant 22 may have more impurities IMP than the first sealant 21. The impurities IMP are blocked by the first sealant 21, so that the impurities IMP do not make contact with the liquid crystal layer LC. Thus, the liquid crystal display device 1000 according to the present exemplary embodiment may prevent visual artifacts such as afterimage, stain, and light leakage from being generated, as these are usually caused by presence of impurities in the liquid crystal layer LC.

In addition, the light blocking layer BM is overlapped with edges of the liquid crystal layer LC to cover the border area between the sealant 20 and the liquid crystal layer LC. In the present exemplary embodiment, since the afterimage, stain, and light leakage, which occur at the edges of the liquid crystal layer LC, may be prevented by the sealant 20, the area in which the light blocking layer BM is disposed to cover the edges of the liquid crystal layer LC may be minimized, and eventually, the light blocking layer BM may be disposed to avoid overlapping with the liquid crystal layer LC. Thus, the display area DA becomes wider and the non-display area NA becomes smaller in the liquid crystal display device 1000 according to the present exemplary embodiment.

The flexible printed circuit board 40 electrically connects the display panel 10 and the printed circuit board 30. The flexible printed circuit board 40 includes a base film 41 and an integrated circuit chip 42 disposed on the base film 41.

One end of the flexible printed circuit board 40 is bonded to the pad electrode 111 and connected to the display panel 10. The other end of the flexible printed circuit board 40 is bonded to the printed circuit board 30 and electrically connected to the printed circuit board 30.

FIG. 1 shows two flexible printed circuit boards 40, which are disposed to be spaced apart from each other in the second direction DR2, but the number of the flexible printed circuit boards 40 should not be limited to two.

The printed circuit board 30 drives the display panel 10. The printed circuit board 30 includes a driving substrate (not shown) and a plurality of circuit parts (not shown) mounted on the driving substrate.

Although not shown in figures, the liquid crystal display device 1000 may further include a backlight unit disposed under the display panel 10. The backlight unit provides light to the display panel 10.

Although not shown in figures, the liquid crystal display device 1000 may further include a pair of polarizing plates facing each other such that the display panel 10 is disposed between the polarizing plates. A transmission axis of one of the pair of polarizing plates may be substantially perpendicular to that of the other of the pair of polarizing plates.

Figure 3:
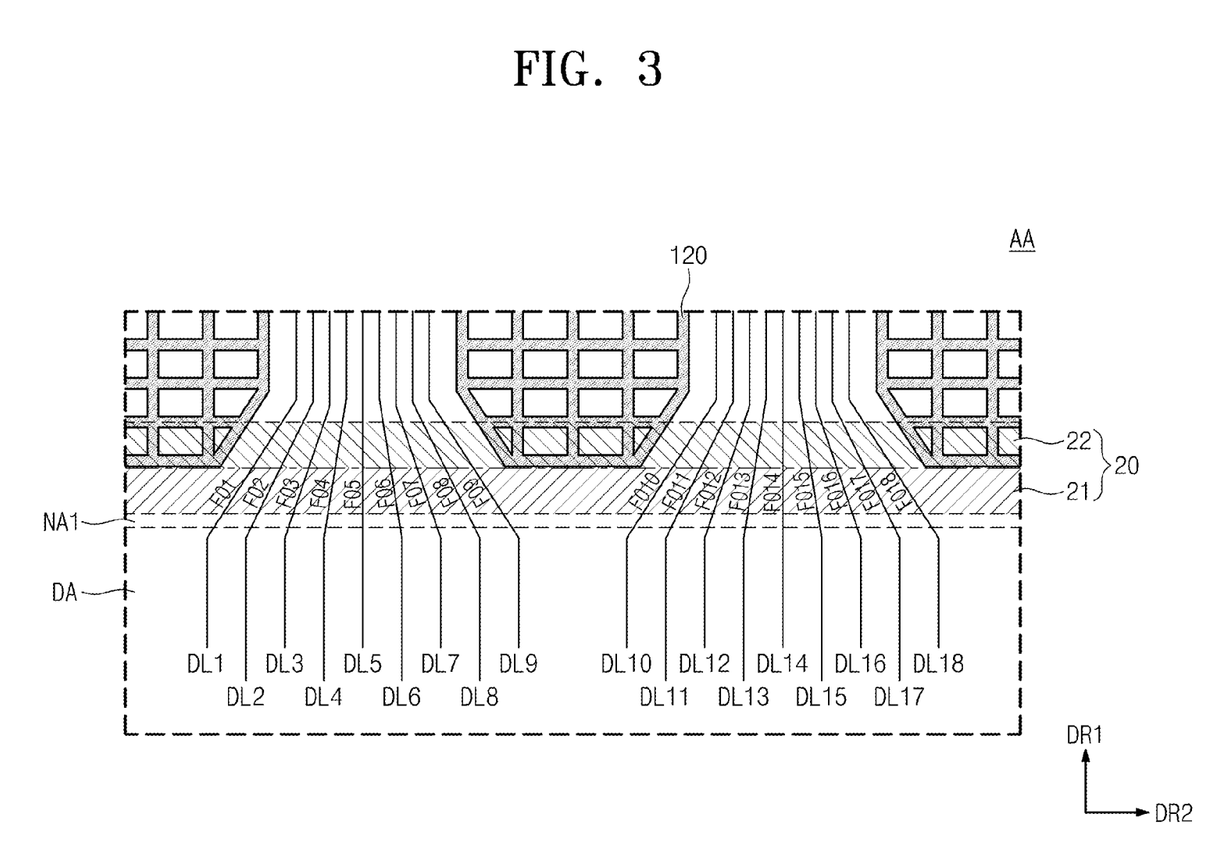
FIG. 3 is a plan view showing an enlarged portion AA of a first display substrate of FIG. 1 according to an exemplary embodiment of the present disclosure.

FIG. 3 is a plan view showing an enlarged portion AA of the first display substrate of FIG. 1 according to an exemplary embodiment of the present disclosure.

Referring to FIG. 3, the first display substrate 100 further includes fan-out lines FO1 to FO18.

The fan-out lines FO1 to FO18 electrically connect data lines DL1 to DL18 to the flexible printed circuit board 40 (refer to FIG. 1). In detail, the fan-out lines FO1 to FO18 are connected to the flexible printed circuit board 40 through the pad electrode 111 shown in FIG. 2. The fan-out lines FO1 to FO18 are disposed to overlap with the first non-display area NA1.

The fan-out lines FO1 to FO18 are configured to include a first fan-out line group FO1 to FO9 and a second fan-out line group FO10 to FO18. The flexible printed circuit board connected to the first fan-out line group FO1 to FO9 may be different from the flexible printed circuit board connected to the second fan-out line group FO10 to FO18. In FIG. 3, the first fan-out line group FO1 to FO9 is connected to first to ninth data lines DL1 to DL9 and the second fan-out line group FO10 to FO18 is connected to tenth to eighteenth data lines DL10 to DL18.

The upper common line 120 is spaced apart from the fan-out lines FO1 to FO18 and overlapped with the first non-display area NA1. The upper common line 120 may be disposed between the first fan-out line group FO1 to FO9 and the second fan-out line group FO10 to FO18.

An upper common line 120 is connected to the flexible printed circuit board 40 shown in FIG. 1 to receive the common voltage. The upper common line 120 is connected to the common electrode CE shown in FIG. 2 to provide the common voltage to the common electrode CE. To this end, a conductive spacer (not shown) may be disposed between the first display substrate 100 and the second display substrate 200. The conductive spacer may make contact with the upper common line 120 and the common electrode CE.

The sealant 20 overlaps with the fan-out lines FO1 to FO18 and the upper common line 120.

The upper common line 120 is not overlapped with the first sealant 21 and is overlapped with the second sealant 22.

The upper common line 120 may have a mesh shape defined by lines with a uniform width.

When viewed in a vertical direction with respect to a direction in which the sealant 20 extends, a ratio (hereinafter, referred to as an upper opening ratio) of an area of the fan-out lines FO1 to FO18 and the upper common line 120 to an area exposed by the fan-out lines FO1 to FO18 and the upper common line 120 of the first sealant 21 is greater than an upper opening ratio of the second sealant 22.

Since the upper common line 120 is overlapped with the second sealant 22 and is not overlapped with the first sealant 21, the first sealant 21 is not covered by the upper common line 120 and the second sealant 22 is partially covered by the upper common line 120. In detail, the first sealant 21 has the upper opening ratio from about 50% to about 100%, and the second sealant 22 has the upper opening ratio from about 0% to about 50%.

According to a manufacturing method of the liquid crystal display device, a sealant material is formed between the first display substrate 100 and the second display substrate 200, and the sealant material is cured by irradiating an ultraviolet light thereto from a rear side of the first display substrate 100. In this case, since the first sealant 21 has the upper opening ratio greater than that of the second sealant 22, the first sealant 21 is more cured than the second sealant 22.

Figure 4:
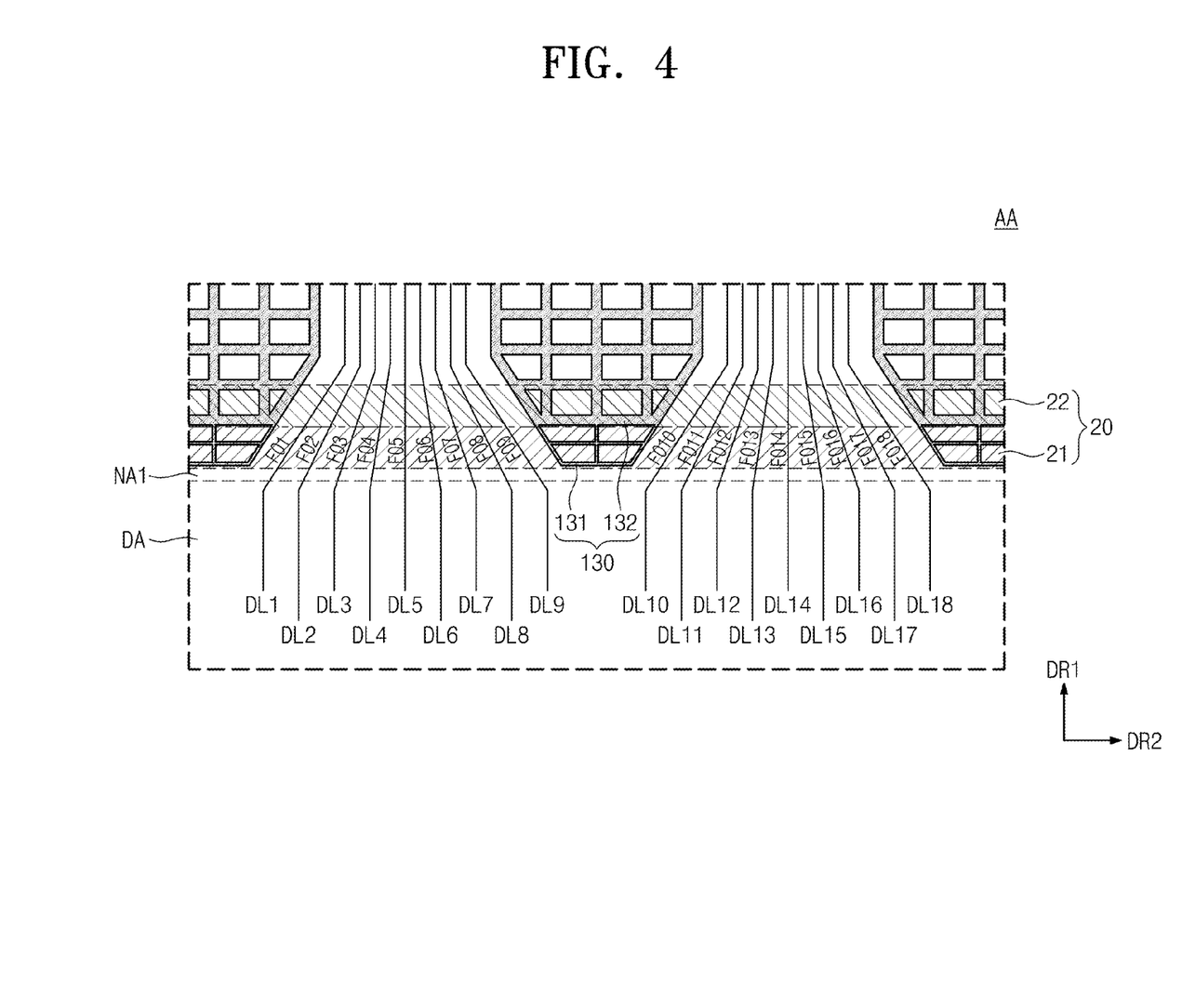
FIG. 4 is a plan view showing the enlarged portion of AA of the first display substrate of FIG. 1 according to another exemplary embodiment of the present disclosure.

FIG. 4 is a plan view showing an enlarged portion of AA of the first display substrate of FIG. 1 according to another exemplary embodiment of the present disclosure.

A first display substrate 100 shown in FIG. 4 has substantially the same structure and function as the first display substrate 100 shown in FIG. 3 except that it includes an upper common line 130. Hereinafter, descriptions will be focused on the upper common line 130, and thus detailed descriptions on the other elements will be omitted.

The upper common line 130 includes a first upper common line 131 and a second upper common line 132.

The first upper common line 131 is overlapped with the first sealant 21 and the second upper common line 132 is overlapped with the second sealant 22.

The first upper common line 131 is formed as a grid/mesh with a first width, and the second upper common line 132 is a grid/mesh with a second width greater than the first width.

Figure 5:
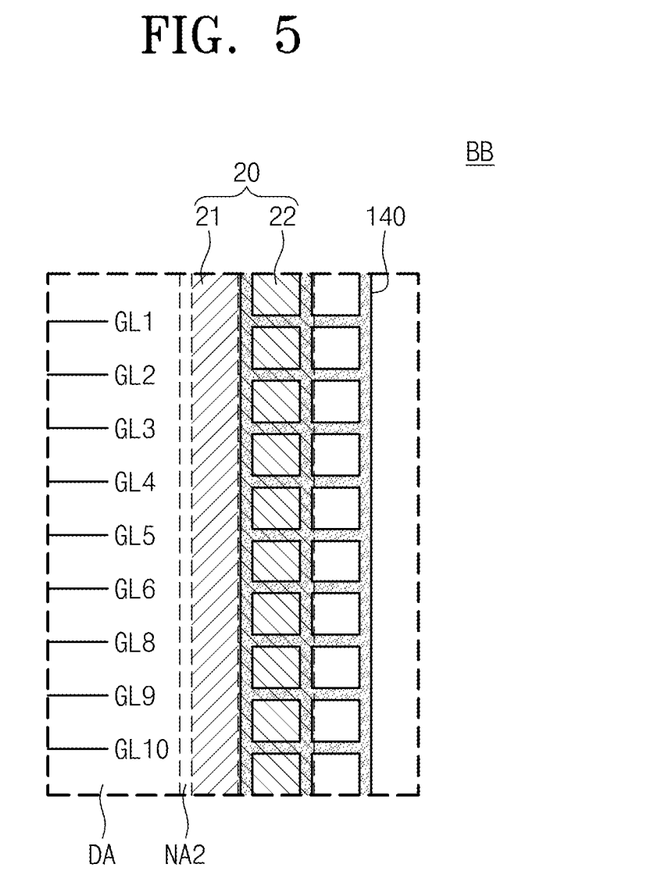
FIG. 5 is a plan view showing an enlarged portion of BB of the first display substrate of FIG. 1 according to an exemplary embodiment of the present disclosure.

FIG. 5 is a plan view showing an enlarged portion of BB of the first display substrate of FIG. 1 according to an exemplary embodiment of the present disclosure.

Referring to FIG. 5, the first display substrate 100 further includes a side common line 140.

The side common line 140 is spaced apart from the gate lines GL1 to GL10 in the second direction DR2 and overlapped with the second non-display area NA2.

The side common line 140 is connected to the flexible printed circuit board 40 shown in FIG. 1 to receive the common voltage. The side common line 140 is connected to the common electrode CE shown in FIG. 2 to provide the common voltage to the common electrode CE. To this end, a conductive spacer (not shown) may be disposed between the first display substrate 100 and the second display substrate 200. The conductive spacer makes contact with the side common line 140 and the common electrode CE.

The side common line 140 does not overlap with the first sealant 21 and overlaps with the second sealant 22. The side common line 140 may be formed as a grid/mesh made of lines with a uniform width.

A side opening ratio of the first sealant 21, which is the ratio of an area of the side common line 140 to the area in the first sealant 21 that is not covered by the side common line 140, is greater than a side opening ratio of the second sealant 22.

Since the side common line 140 is overlapped with the second sealant 22 and is not overlapped with the first sealant 21, the first sealant 21 is not covered by the side common line 140 and the second sealant 22 is partially covered by the side common line 140. In detail, the first sealant 21 has the side opening ratio from about 50% to about 100%, and the second sealant 22 has the side opening ratio from about 0% to about 50%.

According to a manufacturing method of the liquid crystal display device, a sealant material is formed between the first display substrate 100 and the second display substrate 200, and the sealant material is cured by irradiating with ultra-violet (UV) light from the side that is closer to the first display substrate 100 than to the second display substrate 200. Since the first sealant 21 has the side opening ratio greater than the second sealant 22, the first sealant 21 is more cured than the second sealant 22.

Figure 6:
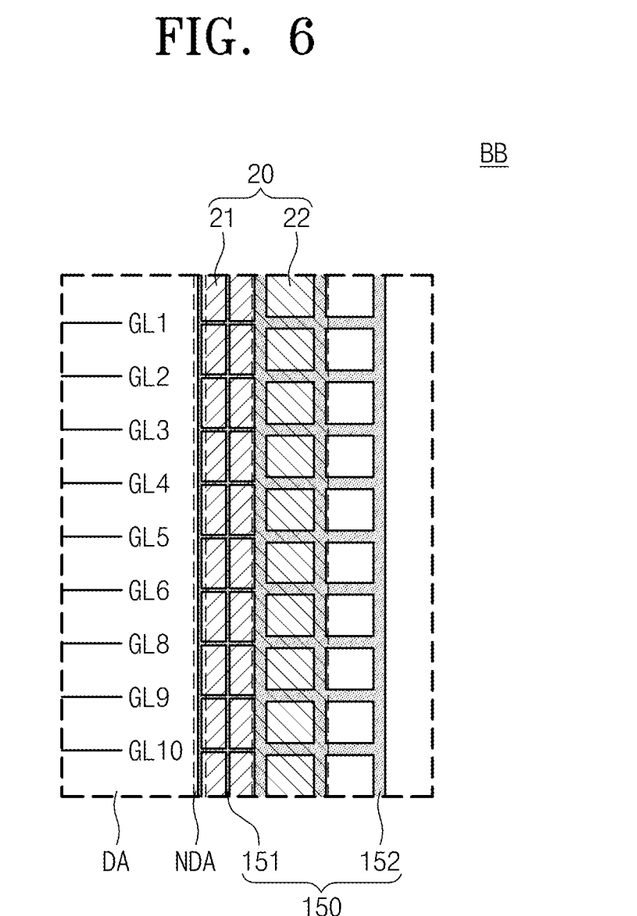
FIG. 6 is a plan view showing the enlarged portion of BB of the first display substrate of FIG. 1 according to another exemplary embodiment of the present disclosure.

FIG. 6 is a plan view showing an enlarged portion of BB of the first display substrate of FIG. 1 according to another exemplary embodiment of the present disclosure.

A first display substrate 100 shown in FIG. 6 has the same structure and function as the first display substrate 100 shown in FIG. 5 except for a side common line 150. Hereinafter, descriptions will be focused on the side common line 150, and thus detailed descriptions on the other elements will be omitted.

The side common line 150 includes a first side common line 151 and a second side common line 152.

The first side common line 151 is overlapped with the first sealant 21 and the second side common line 152 is overlapped with the second sealant 22.

The first side common line 151 is formed as a grid/mesh defined by lines with a first width, and the second side common line 152 is formed as a grid/mesh defined by lines with a second width, which is greater than the first width.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A liquid crystal display device comprising:
a first display substrate;
a second display substrate facing the first display substrate;
a liquid crystal layer interposed between the first display substrate and the second display substrate;
a sealant disposed between the first display substrate and the second display substrate to seal the liquid crystal layer, wherein the sealant comprises a first sealant that contacts the liquid crystal layer and a second sealant across the first sealant from the liquid crystal layer, wherein the first sealant has a cure rate greater than a cure rate of the second sealant; and
an upper common line overlapping the second sealant without overlapping the first sealant, the upper common line receiving a common voltage.

2. The liquid crystal display device of claim 1, wherein the first display substrate comprises a display area and a non-display area surrounding the display area, and the sealant is overlapped with the non-display area.

3. The liquid crystal display device of claim 2, further comprising:
a printed circuit board that controls an operation of the first display substrate and the second display substrate; and
a flexible printed circuit board that electrically connects the first display substrate and the printed circuit board.

4. The liquid crystal display device of claim 3, wherein the first display substrate further comprises:
data lines disposed to overlap with the display area and extending in a first direction; and
fan-out lines electrically connecting the data lines to the flexible printed circuit board and disposed to overlap with the non-display area;
wherein the upper common line is spaced apart from the fan-out lines and overlapped with the non-display area.

5. The liquid crystal display device of claim 4, wherein a ratio of an area that is covered by the fan-out lines and the upper common line to an area exposed by the fan-out lines and the upper common line in the first sealant is greater than that in the second sealant when viewed in a vertical direction with respect to a direction in which the sealant extends.

6. The liquid crystal display device of claim 4, wherein the flexible printed circuit board further comprises a first flexible printed circuit board and a second flexible printed circuit board spaced apart from each other, wherein the fan-out lines comprise a first fan-out line group connected to the first flexible printed circuit board and a second fan-out line group connected to the second flexible printed circuit board, and the upper common line is disposed between the first fan-out line group and the second fan-out line group.

7. The liquid crystal display device of claim 4, wherein the upper common line is connected to the flexible printed circuit board to receive a common voltage.

8. The liquid crystal display device of claim 4, wherein the sealant is overlapped with the fan-out lines and the upper common line.

9. The liquid crystal display device of claim 8, wherein the upper common line is formed as a mesh defined by lines with a uniform width.

10. The liquid crystal display device of claim 8, wherein the upper common line comprises:
a first upper common line overlapped with the first sealant; and
a second upper common line overlapped with the second sealant.

11. The liquid crystal display device of claim 10, wherein the first upper common line has a mesh shape defined by lines with a first width and the second upper common line has a mesh shape defined by lines with a second width greater than the first width.

12. The liquid crystal display device of claim 4, wherein the first display substrate further comprises:
gate lines disposed to overlap with the display area and extending in a second direction crossing the first direction; and
a side common line spaced apart from the gate lines in the second direction and overlapped with the non-display area.

13. The liquid crystal display device of claim 12, wherein a ratio of an area of the side common line to an area exposed by the side common line in the first sealant is greater than that of the second sealant when viewed in a vertical direction with respect to a direction in which the sealant extends.

14. The liquid crystal display device of claim 12, wherein the side common line is connected to the flexible printed circuit board to receive a common voltage.

15. The liquid crystal display device of claim 12, wherein the side common line is not overlapped with the first sealant and is overlapped with the second sealant.

16. The liquid crystal display device of claim 15, wherein the side common line has a mesh shape defined by lines with a uniform width.

17. The liquid crystal display device of claim 12, wherein the side common line comprises:
- a first side common line overlapped with the first sealant; and
- a second side common line overlapped with the second sealant.

18. The liquid crystal display device of claim 17, wherein the first side common line is formed as a mesh defined by lines with a first width and a second side common line is formed as a mesh defined by lines with a second width, is the second width being greater than the first width.

* * * * *